United States Patent [19]
Chi

[11] Patent Number: 5,470,044
[45] Date of Patent: Nov. 28, 1995

[54] SAFETY FAUCET

[76] Inventor: James Chi, No. 17, Chung-Hsing Rd., Tu-Cheng; Taipei Hsien, Taiwan

[21] Appl. No.: 320,226

[22] Filed: Oct. 11, 1994

[51] Int. Cl.[6] .............................. F16K 35/02; F16K 31/60
[52] U.S. Cl. .................. 251/98; 251/102; 251/229; 251/231; 251/322; 251/323; 251/331; 222/505; 222/153.1
[58] Field of Search ................. 74/523, 543; 116/110 R; 251/89, 90, 98, 101, 102, 103, 104, 107, 108, 109, 229, 231, 322, 323, 331, 335.2; 222/153, 505

[56] References Cited

U.S. PATENT DOCUMENTS

| | | | |
|---|---|---|---|
| 1,483,467 | 2/1924 | Meden | 251/109 |
| 1,758,727 | 5/1930 | Wildin | 251/104 |
| 2,147,287 | 2/1939 | Farmer | 251/109 |
| 2,852,225 | 9/1958 | Klingier | 251/109 |
| 3,138,331 | 6/1964 | Kutik | 251/89 |
| 3,648,970 | 3/1972 | Hartmann et al. | 251/110 |
| 3,734,353 | 5/1973 | Mc Ihenny | 222/153 |
| 4,018,292 | 4/1977 | Roll et al. | 251/109 |
| 4,093,178 | 6/1978 | Hughes et al. | 251/110 |
| 4,442,955 | 4/1984 | Bush | 222/153 |
| 4,909,275 | 3/1990 | Massey et al. | 251/104 |

*Primary Examiner*—George L. Walton
*Attorney, Agent, or Firm*—Bacon & Thomas

[57] ABSTRACT

A safety faucet including a handle having an opening, a safety sliding block received in the opening on the handle, a casing, and a valve device mounted within the casing, the valve device including a cap fastened to the casing, a valve stem having one covered end with a water stopper and the other end extended out of a hole on the cap and pivotally secured to the handle, and a spring mounted around the valve stem and disposed inside the casing, when the safety sliding block is pressed with the handle to engage projecting plates of the block against the top cap, the valve stem and the water stopper can be lifted by the handle to open the water passage through the casing.

3 Claims, 4 Drawing Sheets

5,470,044

SAFETY FAUCET

BACKGROUND OF THE INVENTION

The present invention relates to faucets, and relates more particularly to a safety faucet which comprises a safety sliding block mounted within an opening on the handle, wherein the water passage can be opened only when the safety sliding block and handle are simultaneously pressed downwardly.

A conventional faucet for drinking water equipment is generally comprised of a casing, a handle, and a valve controlled by the handle to close/open the water passage through the casing. This known structure is not safe in use for controlling the flow of hot water because there isn't any safety means to lock the handle, and the water passage can be easily opened when a child plays with the handle.

SUMMARY OF THE INVENTION

The present invention overcomes the above problem by providing a safety faucet. According to one aspect of the present invention, the safety faucet comprises a handle having an opening, a safety sliding block received in the opening on the handle, a casing, and a valve device mounted within the casing, the valve device including a cap fastened to the casing, a valve stem having one end covered with a water stopper and the opposite end extended out of a hole on the cap and pivoted to the handle, and a spring mounted around the valve stem and disposed inside the casing. When the safety sliding block and handle are simultaneously pressed to engage projecting plates of the block against the cap, the valve stem and to water stopper can be lifted to open the water passage.

According to another aspect of the present invention, the handle has a long rear end which does not engage against the cap of the valve device even when the handle is pushed upwards. Therefore, when the handle is pushed upwards, no lever motion is created to lift the valve stem.

According to another aspect of the present invention, the handle has two downward stop blocks which engage against the periphery of the cap of the valve device to limit the downward movement of the handle. If one only presses the handle without pressing simultaneously the safety sliding block, the stop block on the handle will prevent the valve stem from being lifted up, and the water passage will remain closed.

DETAILED DESCRIPTION OF THE PREFERRED EMBODIMENT

Figure 1:
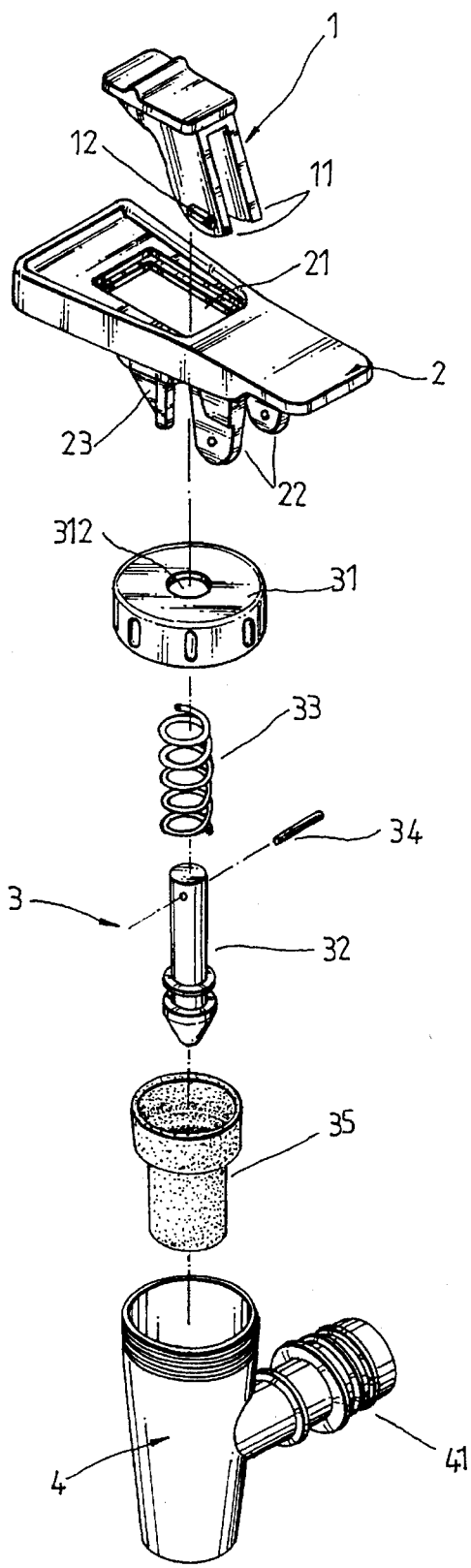
FIG. 1 is an exploded view perspective of a safety faucet according to the present invention.

Referring to FIG. 1, a safety faucet in accordance with the present invention is generally comprised of a safety sliding block 1, a handle 2, a valve device 3, and a casing 4.

The safety sliding block 1 comprises a plurality of projecting plates 11 on one side, each projecting plate 11 having a respective tooth 12 at its outer side. The safety sliding block 1 is movably coupled to the handle 2. When lifting or pressing the handle 2, the teeth 12 prevent the safety sliding block 1 from detaching from the handle 2. The handle 2 has an opening 21 through which plates 11 of block 1 are received and permit independent movement of block 1 relative to handle 2. Safety sliding block also includes two downward lugs 22, and two downward stop blocks 23 spaced from the lugs 22. The lugs 22 are shorter than the projecting plates 11 of the safety sliding block 1. The valve device 3 comprises a cap 31 having a center through hole 312, a valve stem 32 having a top end inserted through the center through hole 312 of the cap 31 from the bottom and pivotably connected between the two lugs 22 by a pivot 34. Stem 32 also includes a bottom end covered with a water stopper 35, and a spring 33 mounted around the valve stem 32. The casing 4 is a three-way casing having a horizontal portion terminating in a water service pipe 41 and a vertical portion controlled by the valve device 3 to let water pass through. The cap 31 is fastened threadedly to the casing 4 by a screw joint to hold the spring 33, the valve stem 32 and the water stopper 35 inside the casing 4.

Figure 2:
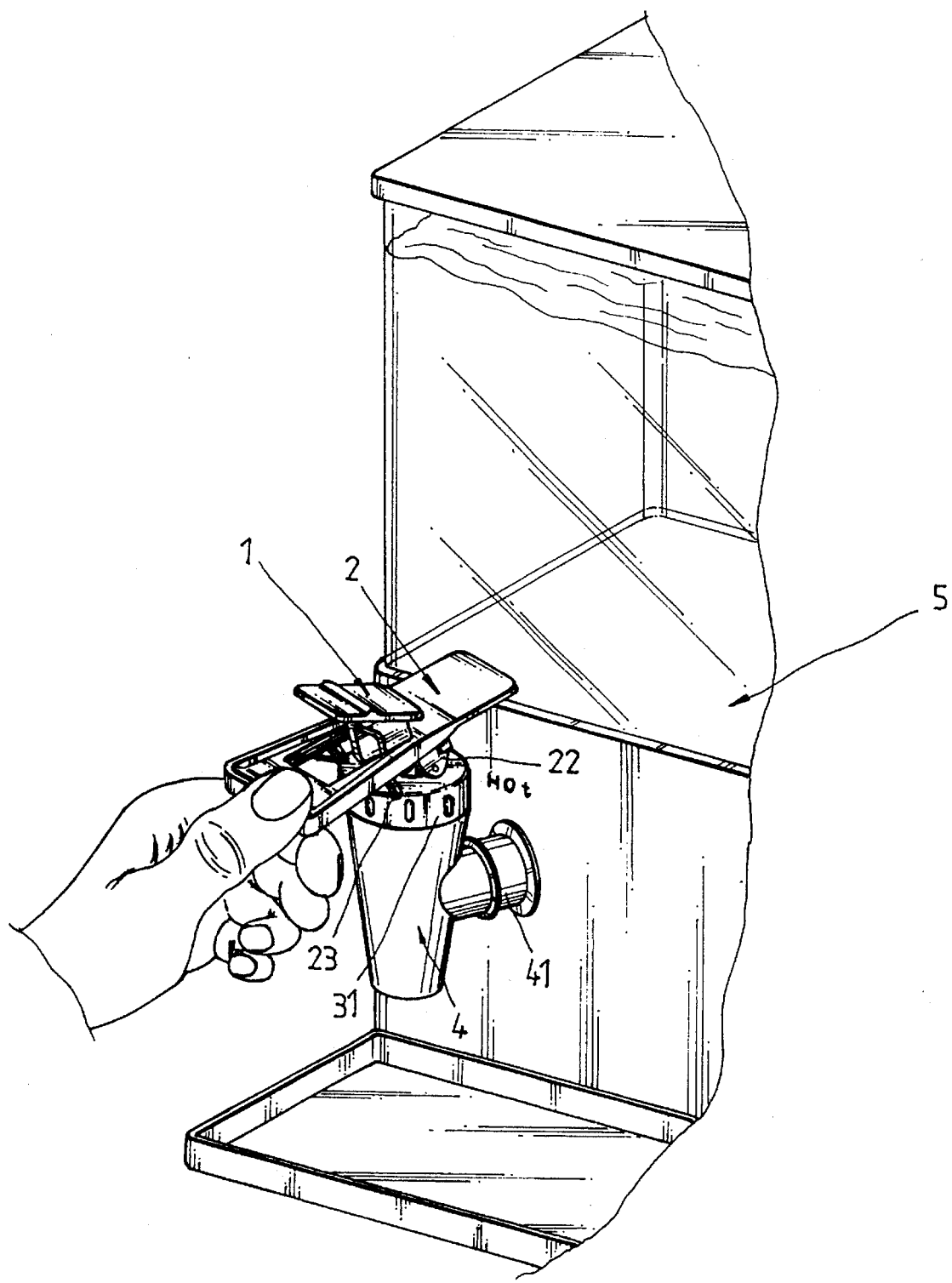
FIG. 2 is a perspective operational view of the safety faucet, shown in FIG. 1, showing only the handle being pressed downwards.

Referring to FIG. 2, when installed, the lugs 22 are disposed above the top cap 31, and the water service pipe 41 of the casing 4 is connected to a water supply source 5.

Figure 2A:
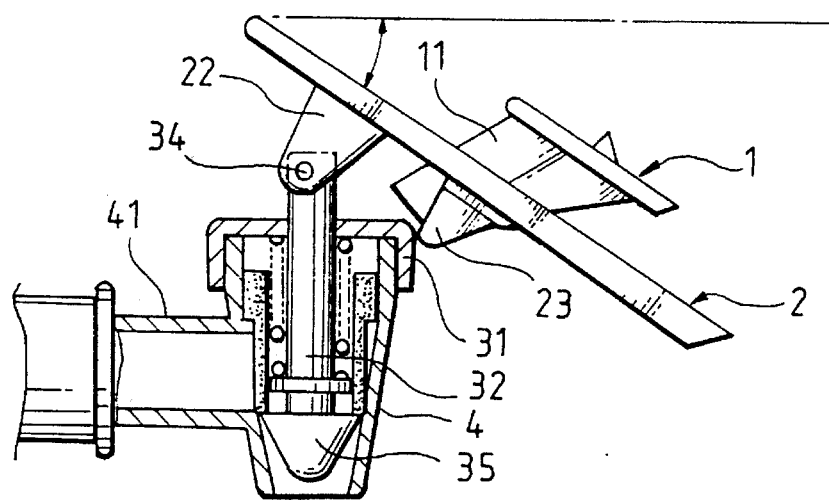
FIG. 2A is a cross sectional view of the faucet shown in FIG. 2.

Referring to FIGS. 2 and 2A, when the handle 2 is pressed down, the stop blocks 23 engage the periphery of the cap 31 to limit the downward movement of the handle 2 about pivot 34 to a point before handle 2 is able to lift the water stopper 35 and the valve stem 32 to open the water passage through the casing 4. Thus, valve device 3 cannot be placed in an open position by only pressing handle 2 downwardly.

Figure 3A:
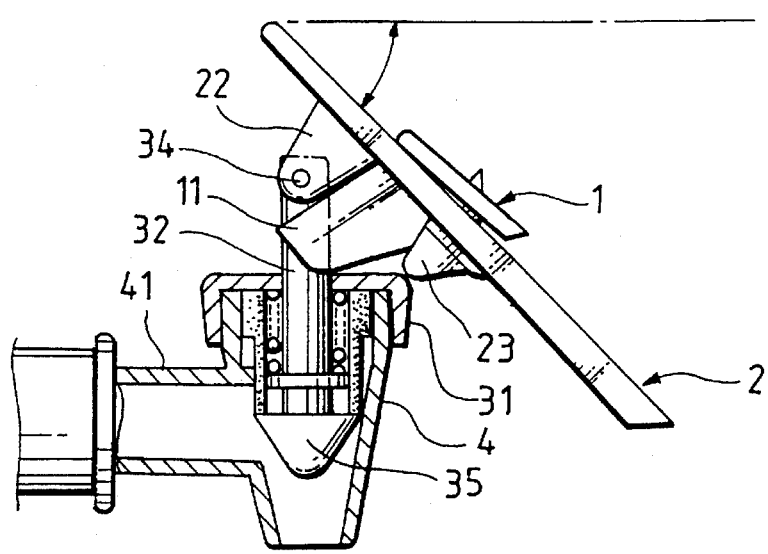
FIG. 3A is a cross sectional view of the faucet shown in FIG. 3.
Figure 3:
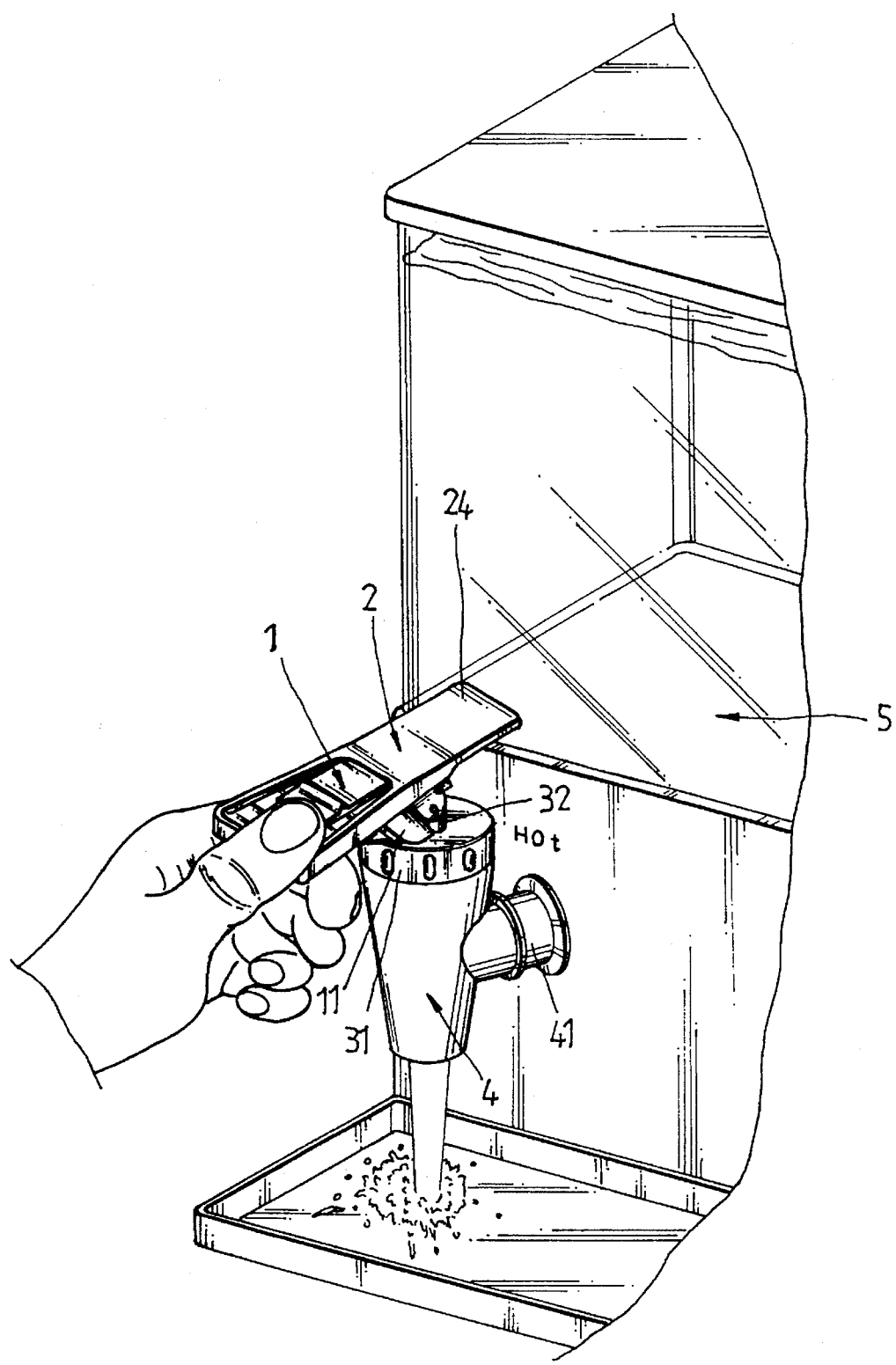
FIG. 3 is similar to FIG. 2 but showing both the handle and the safety sliding block simultaneously pressed downwards and water flowing out of the casing.

Referring to FIGS. 3 and 3A, when the safety sliding block 1 and the handle 2 are simultaneously pressed downwardly, the projecting plates 11 of block 1 are disposed in abutting engagement against lugs 22 and the top of cap 31, thereby lifting valve stem 32 and water stopper 35 to place valve device 3 in an open position to permit water to flow from supply source 5 through intake pipe 41 and out of casing 4. During the simultaneous downward movement of block 1 and handle 2, plates 11 essentially function as levers having fulcrum points at the top of cap 31 for lifting stem 32.

Referring to FIG. 3 again, the handle 2 has a long rear end 24 which does not engage the top of cap 31 even when the handle 2 is pushed upwards. Therefore, the handle 2 does not cause a lever motion when it is pushed upwards.

While only one embodiment of the present invention has been shown and described, it will be understood that various modifications and changes could be made without departing from the spirit and scope of the invention.

What is claimed is:

1. A safety faucet comprising:

a) a handle having an opening adjacent an end thereof, a pair of downwardly extending lugs and a pair of downwardly extending stop blocks disposed adjacent the lugs;

b) a sliding block mounted through the opening of the handle, the sliding block including a plurality of downwardly projecting plates extending through the opening of the handle, the projecting plates having teeth means for retaining the sliding block to the handle and permitting independent movement of the block relative to the handle;

c) a valve device including a cap having a center hole formed therethrough, a valve stem having a top end and a bottom end, the top end being inserted through the center hole of the cap and pivotally connected to the lugs of the handle, a water stopper covering the bottom end, and a spring means mounted around the valve stem;

d) a three-way casing including a horizontal portion for connection to a water supply source and a vertical portion secured to the cap of the valve device; and e) wherein when only the handle is pressed downwardly, the stop locks engage the periphery of the cap to prevent lifting of the valve stem, and when the sliding block is held against sliding movement within said handle opening both the sliding block and handle are held together and simultaneously pressed downwardly, the projecting plates engage the lugs and the top of the cap to function as levers with fulcrum points on the cap for lifting the valve stem and place the valve device in an open position.

2. The safety faucet of claim 1 wherein the lugs of the handle is shorter than the projecting plates of the sliding block.

3. The safety faucet of claim 1 wherein the vertical portion is threadedly secured to the cap.

* * * * *